Aug. 7, 1956        M. K. NICKS        2,757,682

KEG TAPPING DEVICE

Filed April 13, 1953

Inventor
Milton K. Nicks
By Charles L. Lovercheck
Attorney

United States Patent Office 2,757,682
Patented Aug. 7, 1956

2,757,682

KEG TAPPING DEVICE

Milton K. Nicks, Union City, Pa.

Application April 13, 1953, Serial No. 348,396

7 Claims. (Cl. 137—212)

This invention relates to a beer tapping device construction and more particularly to devices having liquids from a barrel wherein a tube is inserted into the barrel and pressure exerted on top of the liquid therein to force it through a tube.

In the tapping of beer barrels, the removal of the beer is an expensive process thereof in taverns and cabarets and the conventional practice is to provide a coupling which meets with the bayonet type coupling in the top of the beer barrel, snap this coupling into place, rotate a handle which tightens a sleeve down into sealing engagement with a washer and the top of the bayonet coupling in the barrel, then insert a hollow beer rod through the top of the coupling into the beer in the barrel, forcing the stopper of the top of the barrel into the barrel, and when the beer rod is near the bottom of the barrel, a collar is tightened to force the resilient washer into sealing engagement with the outside of the beer rod to prevent leakage therearound, and then air pressure is introduced into the beer barrel to force the beer through the beer rod to be dispensed into glasses or other containers. The above mentioned procedure is obviously time consuming and a considerable number of separable parts is necessary. Once the beer rod has been inserted into the barrel, the cork from the barrel removed, and pressure put on the beer, it is impossible to remove the rod without loss of beer through the top of the coupling.

It is, accordingly, an object of my invention to overcome the above and other defects and inconveniences in prior beer tapping devices by providing a beer tapping device which is simple in construction, economical in cost, simple in operation, and durable in use.

Another object of the invention is to provide a beer tapping device which can be connected to the top of a beer barrel or other container by merely snapping the connector to the top of the barrel.

Another object of the invention is to provide a beer keg tapping device wherein the beer rod can be inserted into the beer keg at will without the loss of beer.

Another object of the invention is to provide a keg tapping device wherein a resilient valve is provided to prevent the escape of liquid and air from the keg around a hollow rod inserted through the valve.

With the above and other objects in view, the present invention consists of the combination and arrangement of parts hereinafter more fully described, illustrated in the accompanying drawing, and more particularly pointed out in the appended claims, it being understood that changes may be made in the form, size, proportions, and minor details of construction without departing from the spirit or sacrificing any of the advantages of the invention.

Figure 1:
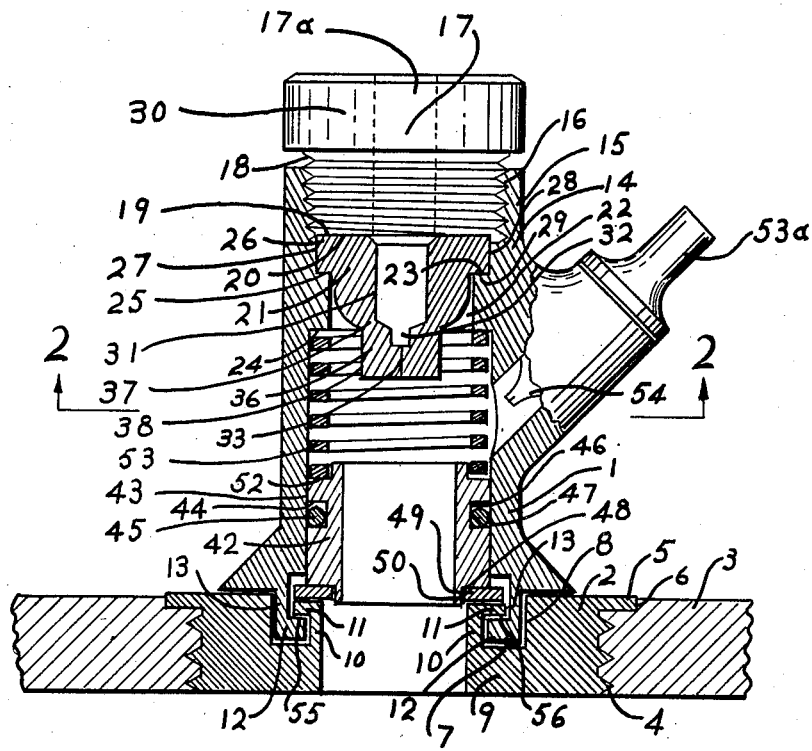
Fig. 1 is a side view partly in cross section of a keg tapping device according to my invention.
Figure 2:
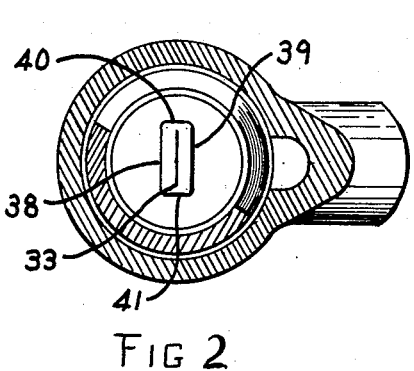
Fig. 2 is a cross sectional view taken on line 2—2 of Fig. 1 with the beer rod removed from the valve as shown in Fig. 1.
Figure 3:
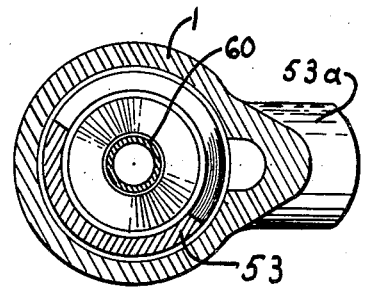
Fig. 3 is a view similar to Fig. 1 with a beer rod inserted through the valve.

Now with more specific reference to the drawing, I disclose a beer tapping device 1 for attachment to a fitting or adapter 2 on a conventional beer keg 3. The keg 3 is of the conventional wood or metal type having the lugs 4 which engage corresponding notches in the beer keg 3. The fitting 2 may have a flange 5 which overlaps the top of the keg and rests in a groove 6 therein. The adapter 2 has grooves 7 formed therein defined by the circumferential shoulder 8 and the downwardly projecting flange 9. Attached to upwardly extending flanges 10 are spaced lugs 11 which engage complementary spaced lugs 12 which are attached to downwardly extending flange 13 on the bottom of the tapping device 1.

The tapping device 1 has a hollow body member 14. The upper end of the body member 15 is internally threaded at 16 to receive the packing collar 17 which has external threads 18 which mate with threads 16 on the tapping device. The lower end of the packing collar 17 terminates in a shoulder 19 which engages the top surface 20 of the valve 21. The outer peripheral surface is provided with a knurled surface 30 for convenience in removing the collar. The collar 17 has an opening 17a therethrough. A reduced diameter section is defined by rim 22 integral with the body member 14 and defines the upwardly facing shoulder 23 and the downwardly facing shoulder 24. The shoulder 23 forms a support for the shoulder 25 of the valve 21.

The upper end of the valve 21 has a circular rim 26 having the edge 27 which may engage the surface 28 of the valve body and the surface 29 is forced into engagement with the shoulder 25 by the packing collar 17 when it is rotated downwardly. The valve 21 has the countersunk portion 31 which terminates at the lower end in the reduced diameter opening 32 and the slot 33 in the lower end of the valve between the wings 36 which are integral with the body portion of the valve 21 at 37 and which define the slot 33. The wings 36 have the flat outward projecting side portions 38 and 39 and the edge portions 40 and 41.

A sleeve 42 is telescopically received in the bore 43 at the lower end of the tapping device. The sleeve 42 has a circumferential slot 44 formed therein to receive the O-ring 45 which is inserted therein. The O-ring forms sealing engagement between the inner edge 46 of the slot 44 and the internal surface 47 of the tapping device, providing a seal against the escape of liquid and air therebetween. The lower end of the sleeve 42 is provided with a shoulder 48 which engages the resilient washer 49 and the resilient washer 49 is held in fixed location by the downwardly extending cylindrical end 50 on the sleeve member. The upper end of the sleeve is provided with a shoulder 52 which engages the spring 53. The upper end of the spring rests against the shoulder 24. An air inlet 53a is provided which may be connected to a source of compressed air and a check valve 54 is provided inside the air inlet 53a to prevent the escape of air pressure from inside the keg 3 once the pressure has been established.

During operation, a beer keg 3 is equipped with the tapping device in a manner described as follows: The lugs 12 are disposed downwardly between the spaced lugs 11 of the adapter 2 and the body of the tapping device 1 is then rotated so that the top surface 55 of the lugs 12 engage the bottom surface 56 of the lugs 11. This will cause the sleeve 42 to slide telescopically upward inside the tapping device against the force of the spring 53, thereby compressing the spring and causing the O-ring to slide along the bore 43 of the tapping device. The spring 53 will hold the washer 49 in sealing engagement with the top of the flange 10, thereby providing a seal therebetween. The hollow beer rod 60 can then be inserted through the hole 17a in the packing collar and the hollow 31 of the valve 21, through the slot 33, thereby expanding the slot 33, and the beer rod can be pushed down until it comes nearly into engagement with the bottom of the beer barrel. Air pressure can be admitted through the inlet 53a to cause the beer to flow upward through the beer rod. The pressure of the air will exert a force on the outside edges 38 and 41 of the valve member 21, thereby causing the slot 33 to form a nearly perfect seal between the beer rod and the valve. If it is desired to remove the beer rod, it can merely be pulled upward from the valve and the air pressure will cause the air in the keg to exert a force on the outside edges 38, 39, 40, and 41 of the valve, thereby causing the slit to form sealing engagement. It will be noted from the inspection of the device that the greater the force of air pressure inside the beer barrel, the tighter the slit 33 will seal against the outside surface of the beer rod, thereby preventing a leakage of any fluid therefrom.

In the foregoing specification, I have set forth the invention in its preferred practical forms but I am aware that the structure shown is capable of modification within a range of equivalents without departing from the invention which is to be understood is broadly novel as is commensurate with the appended claims.

What I claim is:

1. In a beer tap adapted to interlock with a tubular tap fitting having latching lugs, a hollow body member, lugs engageable with mating lugs on a beer barrel, a hollow cylindrical member slidable in said body member, a washer engaging said cylindrical member, a spring, said spring urging said washer into engagement with said cylindrical member and said tap fitting, and sealing means between said cylindrical member and said body member, said sealing means comprising a washer O-shaped in cross section engaging said cylindrical member and said hollow body member, means to form sealing engagement with a tube extending through said hollow body, and means to admit gas under pressure into said hollow body member.

2. In a beer tap adapted to interlock with a tubular tap fitting having latching lugs, a hollow body member, lugs engageable with mating lugs on a beer barrel, a hollow cylindrical member slidable in said body member, a washer engaging said cylindrical member, a spring, said spring urging said washer into engagement with said tap fitting and said cylindrical member, and sealing means between said cylindrical member and said body member, said sealing means comprising a washer O-shaped in cross section engaging said cylindrical member and said hollow body member, said O-shaped washer disposed in a circumferential slot in said cylindrical member, means to form sealing engagement with a tube extending through said hollow body, and means to admit gas under pressure into said hollow body member.

3. In a beer tap adapted to interlock with a tubular tap fitting having latching lugs, a hollow body member, lugs engageable with mating lugs on a beer barrel, a hollow cylindrical member slidable in said body member, a washer engaging said cylindrical member, a spring, said spring urging said washer into engagement with said tap fitting, sealing means between said cylindrical member and said body member, a valve in said body, said valve opposing the flow of fluid therethrough, said valve having wings extending toward one end of said body, and a slit in the material between said wings, said wings having outwardly facing surfaces whereby fluid pressure in said hollow member will force said wings together in sealing relation.

4. In a beer tap adapted to interlock with a tubular tap fitting having latching lugs, a hollow body member, lugs engageable with mating lugs on a beer barrel, a hollow cylindrical member slidable in said body member, a washer engaging said cylindrical member, a spring, said spring urging said washer into engagement with said tap fitting, sealing means between said cylindrical member and said body member, a valve in said body, said valve opposing the flow of fluid through said body member, said valve having wings extending toward one end of said body, and a slit in the material between said wings, said wings having outwardly facing surfaces whereby pressure in said hollow member and said beer barrel will force said wings together in sealing relation, said slit adapted to receive a hollow member and to make sealing engagement with said hollow member whereby fluid will not escape between said wings and said member.

5. In a beer tap adapted to interlock with a tubular tap fitting having latching lugs comprising a hollow body member, lugs engageable with mating lugs on a beer barrel, a hollow cylindrical member slidable in said body member, a washer engaging said cylindrical member, a spring, said spring urging said washer into engagement with said tap fitting, sealing means between said cylindrical member and said body member, a valve in said body, said valve opposing the flow of fluid through said hollow member, said valve having wings extending toward one end of said body, a slit in the material between said wings, said wings having outwardly facing surfaces whereby fluid pressure in said hollow body member will force said slit together in sealing relation, said slit adapted to receive a hollow member and to make sealing engagement with said hollow member whereby fluid will not escape between said wings and said member, and means to admit a compressed gas into said hollow member.

6. A keg tapping device comprising a hollow body member having means on one end thereof for attaching said hollow body to a container, a sleeve telescopically received in said hollow body, means to form a seal between said sleeve and said container, a resilient valve member in said hollow body member forming a closure at one end thereof, said valve extending axially of said hollow body from the place of attachment thereto toward said container and terminating in two wings with a slot therebetween, said valve adapted to receive a tubular member through said slot and to form sealing engagement therewith, and means to admit gas under pressure into said hollow body, said means for admitting gas being disposed between said valve and said sleeve.

7. A keg tapping device comprising a hollow cylindrical body having a cylindrical bore therethrough, said body having a first counterbore extending inwardly from one end and a second counterbore extending inwardly from the other end, each said counterbore terminating at the inner end in an outwardly directed shoulder, an internal groove formed adjacent one said end in said first counterbore, the end outward of said groove having lugs thereon adapted to engage complementary lugs on a keg, a hollow cylindrical sleeve slidably disposed in said first counterbore, a helical compression spring disposed in said first counterbore between one said shoulder and said sleeve, a flat washer disposed in said internal groove and extending inwardly and engaging the outer end of said sleeve, an outer peripheral groove in said sleeve and an O-shaped washer therein forming sealing means between said sleeve and the inner surface of said first counterbore, a resilient valve member having an outwardly extending shoulder resting on said shoulder formed at the termination of said second counterbore, said second counterbore being threaded, a threaded member engaging said threaded second counterbore and clamping said valve member in place, the intermediate part of said valve member having wing members extending toward said first counterbore with a slot between said wing members, said slot adapted to receive a hollow beer rod, and means to admit gas under pressure into said hollow body around said beer rod whereby said wing members are urged into sealing engagement with said hollow rod.

References Cited in the file of this patent

UNITED STATES PATENTS

| | | |
|---|---|---|
| 584,091 | Leidich | June 8, 1897 |
| 615,751 | Sands | Dec. 13, 1898 |
| 706,884 | Beebe | Aug. 12, 1902 |
| 1,065,233 | Gittinger | June 17, 1913 |
| 2,041,427 | Meyer | May 19, 1936 |
| 2,138,605 | Landis | Nov. 29, 1938 |
| 2,358,666 | Spayd | Sept. 19, 1944 |
| 2,400,955 | Samel | May 28, 1946 |
| 2,605,784 | Snider | Aug. 5, 1952 |
| 2,638,914 | Flaith et al. | May 19, 1953 |
| 2,692,066 | Conrad | Oct. 19, 1954 |